US011312833B2

(12) United States Patent
Uang

(10) Patent No.: US 11,312,833 B2
(45) Date of Patent: Apr. 26, 2022

(54) FOAM COMPOSITION AND FOAM PRODUCED THEREFROM

(71) Applicants: FENGDA COMPOSITE MATERIALS CO., LTD., Taichung (TW); Yuh Jye Uang, Taichung (TW); Shu Hue Shao, Taichung (TW)

(72) Inventor: Yuh Jye Uang, Taichung (TW)

(73) Assignees: FENGDA COMPOSITE MATERIALS CO., LTD., Taichung (TW); Yuhjye Uang, Taichung (TW); Shu Hue Shao, Taichung (TW)

( * ) Notice: Subject to any disclaimer, the term of this patent is extended or adjusted under 35 U.S.C. 154(b) by 493 days.

(21) Appl. No.: 16/553,152

(22) Filed: Aug. 27, 2019

(65) Prior Publication Data

US 2020/0095391 A1 Mar. 26, 2020

(30) Foreign Application Priority Data

Sep. 21, 2018 (TW) ................. 107133416

(51) Int. Cl.
| | |
|---|---|
| *C08J 9/10* | (2006.01) |
| *C08K 5/25* | (2006.01) |
| *C08K 3/22* | (2006.01) |
| *C08J 9/00* | (2006.01) |
| *C08K 5/14* | (2006.01) |
| *C08K 5/109* | (2006.01) |
| *C08K 5/00* | (2006.01) |
| *C08K 3/013* | (2018.01) |

(52) U.S. Cl.
CPC ........... *C08J 9/0061* (2013.01); *C08J 9/0023* (2013.01); *C08J 9/103* (2013.01); *C08J 9/104* (2013.01); *C08K 3/013* (2018.01); *C08K 3/22* (2013.01); *C08K 5/0016* (2013.01); *C08K 5/109* (2013.01); *C08K 5/14* (2013.01); *C08K 5/25* (2013.01); *C08J 2201/026* (2013.01); *C08J 2323/08* (2013.01); *C08J 2329/14* (2013.01); *C08K 2003/2296* (2013.01); *C08L 2203/14* (2013.01)

(58) Field of Classification Search
CPC ........ C08J 9/0061; C08J 9/0023; C08J 9/103; C08J 9/104; C08J 2201/026; C08J 2323/08; C08J 2329/14; C08J 2203/02; C08J 2203/04; C08J 9/08; C08J 2423/08; C08J 2429/14; C08J 2300/30; C08J 2423/16; C08J 9/0028; C08J 9/0066; C08J 9/0095; C08J 2423/28; C08J 9/0052; C08J 9/04; C08K 3/013; C08K 3/22; C08K 5/0016; C08K 5/109; C08K 5/14; C08K 5/25; C08K 2003/2296; C08K 5/0025; C08K 5/098; C08L 2203/14; C08L 2205/035; C08L 23/12; C08L 29/14; C08L 21/00; C08L 23/0853
See application file for complete search history.

(56) References Cited

U.S. PATENT DOCUMENTS

| | | | |
|---|---|---|---|
| 7,799,840 B2 | 9/2010 | Wheeler et al. | |
| 2015/0266283 A1* | 9/2015 | Uang | ................ B32B 27/12 521/40.5 |
| 2016/0046783 A1 | 2/2016 | Asanuma | |
| 2020/0277483 A1* | 9/2020 | Takahashi | ............. C08J 9/0023 |

FOREIGN PATENT DOCUMENTS

CN  101258194 A  9/2008

* cited by examiner

*Primary Examiner* — Irina S Zemel
(74) *Attorney, Agent, or Firm* — Pai Patent & Trademark Law Firm; Chao-Chang David Pai

(57) ABSTRACT

A foam composition comprises a recycled polyvinyl butyral in an amount from 5 wt % to 70 wt %; an ethylene-ester copolymer in an amount from 10 wt % to 70 wt %; a foaming agent in an amount from 0.5 wt % to 3.5 wt %; a peroxide crosslinking agent in an amount from 0.5 wt % to 3.0 wt %; and a hydrazide crosslinking agent in an amount from 0.1 wt % to 2.5 wt %, based on a total weight of the foam composition. A foam produced from the foam composition can avoid emitting an unpleasant odor of aldehydes, and the foam also has good mechanical properties and good resilience.

15 Claims, No Drawings

FOAM COMPOSITION AND FOAM PRODUCED THEREFROM

CROSS-REFERENCE TO RELATED APPLICATION

The present invention claims the priority of Taiwan Patent Application No. 107133416 filed on Sep. 21, 2018, which is incorporated by reference in the present application in its entirety.

BACKGROUND OF THE INVENTION

1. Field of the Invention

The present invention relates to a foam composition and a foam prepared from said foam composition.

2. Description of Related Art

Polymeric foam materials are widely used in fields of industry, agriculture, military, daily necessities and office supplies because the polymeric foam materials have a large amount of interior bubbles and have advantages of lightweight, material saving, low thermal conductivity and good heat insulation. Moreover, the polymeric foam materials also have an excellent cushion capacity, acoustic insulation, and high specific strength.

In general, the polymeric foam materials can be divided into plastic foam materials and elastomer foam materials based on the raw materials used therein. The plastic foam materials have advantages of easy processing and beautiful color, but the plastic foam materials have poor elasticity, poor slip resistance, and the plastic foam materials are difficult to recycle. On the contrary, the elastomer foam materials have good elasticity and good slip resistance, but the elastomer foam materials are difficult to shape after processing; besides, the manufacturing process thereof will cause a dust contamination and the obtained product has an unpleasant odor.

Polyvinyl butyral (PVB) is widely used in fields of automotive safety glass, aviation navigation, high-rise buildings and solar photovoltaic cells due to its high transparency, high toughness and high elasticity. In addition, polyvinyl butyral also has the advantages of easy processing and shaping, and thus becomes an alternative to foaming materials; however, expensive polyvinyl butyral would incur a high production cost, which is not conducive to industrial development.

To overcome the problem, some methods which utilize waste materials such as scrap materials of producing PVB products or a post-consumer waste of PVB products have been provided. As disclosed in U.S. Pat. No. 7,799,840, a composition for a vibration-damping material comprises a recycled PVB, a vinyl acetate polymer, and a foam agent. A damping layer formed by said vibration-damping composition was sandwiched between two panels to reduce vibration of, for example, automobile body panels, thereby reducing noises generated by the automobile. However, since PVB was prepared from polyvinyl alcohol (PVA) and butyraldehyde, the recycled PVB often had a remaining odor of butyraldehyde or 2-ethyl-2-hexenal. The unpleasant odor limited the application development of the product comprising the recycled PVB.

SUMMARY OF THE INVENTION

To overcome the shortcomings, an objective of the present invention is to provide a foam composition. The foam composition can save the increase of production cost caused by utilizing PVB and obtain the product produced by the foam composition substantially free of odor, thereby improving its potential for commercial product development.

Another objective of the present invention is to provide a foam produced from the foam composition, which has good mechanical properties and a good deformation recovery ability.

The invention is to provide a foam composition. Based on a total weight of the foam composition, the foam composition comprises a recycled polyvinyl butyral in an amount from 5 wt % to 70 wt %; an ethylene-ester copolymer in an amount from 10 wt % to 70 wt %; a foaming agent in an amount from 0.5 wt % to 3.5 wt %; a peroxide crosslinking agent in an amount from 0.5 wt % to 3.0 wt %; and a hydrazide crosslinking agent in an amount from 0.1 wt % to 2.5 wt %.

With specific content ranges of the hydrazide crosslinking agent and of the recycled polyvinyl butyral, the hydrazide crosslinking agent can react with butyraldehyde or 2-ethyl-2-hexenal in the recycled polyvinyl butyral during the foaming process, and thus almost all of said aldehydes will be exhausted and the unpleasant odor generated from the aldehydes will vanish. Wherein, 2-ethyl-2-hexenal is obtained by condensation of two butyraldehyde groups. In addition, during the foaming process, the peroxide crosslinking agent and the hydrazide crosslinking agent crosslink a backbone chain of the polymer components (i.e. PVB, ethylene-ester copolymer, or thermoplastic polyolefin) to form a three-dimensional network structure, thereby improving the mechanical properties such as hardness, shear modulus and elongation of the product thereof. Accordingly, when said product is impacted, it can maintain the original shape by reconstructing the interactions between molecules therein, dissipating the received impact energy and generating a restoring force.

In accordance with the present invention, the recycled PVB is a scrap material of PVB films of producing automotive safety glass or a glass wastes containing PVB films, but it is not limited thereto. Specifically, the recycled PVB is obtained from the wastes of an automotive safety glass, but it is not limited thereto. In addition, when the recycled PVB is obtained from the wastes of an automotive safety glass, it contains about 100 ppm butyraldehyde or its derivatives.

In accordance with the present invention, the hydrazide crosslinking agent and said butyraldehyde or 2-ethyl-2-hexenal process a reduction reaction to produce hydrazone, so as to eliminate the odor of the aldehydes concerned. Moreover, the hydrazide crosslinking agent can be crosslinked with a reactive carbonyl functional group of the recycled PVB or the ethylene-ester copolymer. Specifically, the hydrazide crosslinking agent is selected from the group consisting of: a monohydrazide compound, a dihydrazide compound, a polyhydrazide compound, and any combination thereof. For example, the monohydrazide compound which has one hydrazide group ($—C(=O)—NH—NH_2$) may be lauryl hydrazide, salicylic acid hydrazide, formic hydrazide, or acetic hydrazide, but it is not limited thereto. The dihydrazide compound which has two hydrazide groups may be oxalic acid dihydrazide, succinic dihydrazide, adipic acid dihydrazide, azelaic acid dihydrazide, sebacic acid dihydrazide, or maleic acid dihydrazide, but it is not limited thereto. The polyhydrazide compound which has more than two hydrazide groups may be polyacrylic hydrazide, but it is not limited thereto.

In accordance with the present invention, the peroxide crosslinking agent easily generates free radicals via thermal decomposition. Since the free radicals capture hydrogen atoms of the backbone chain of the polymer components (i.e. PVB, ethylene-ester copolymer, or thermoplastic polyolefin), the carbon atoms which lose said hydrogen atoms of the backbone chain of the polymer components become active and combine with each other to form a cross-linked bond. The peroxide crosslinking agent may be a conventional peroxide crosslinking agent. For example, the peroxide crosslinking agent may be selected from the group consisting of: dicumyl peroxide, 2,5-dimethyl-2,5-di(tert-buytlperoxy)-3 -hexyne, 2,5-dimethyl-2,5-di(tert-butylperoxy)hexane, 1,1-di(tert-butylperoxy)-3,3,5 -trimethylcyclohexane, tert-butyl cumyl peroxide, and any combination thereof. The peroxide crosslinking agent may comprise two or more species of peroxide crosslinking agents, such as a combination of dicumyl peroxide and tert-butyl cumyl peroxide, but it is not limited thereto. Preferably, the peroxide crosslinking agent may be dicumyl peroxide.

In accordance with the present invention, the ethylene-ester copolymer may be selected from the group consisting of: an ethylene-vinyl acetate copolymer (EVA), an ethylene-methyl acrylate copolymer (EMA), an ethylene-ethyl acrylate copolymer (EEA), an ethylene-butyl acrylate copolymer (EBA), and any combination thereof, but it is not limited thereto. Preferably, the ethylene-ester copolymer may be EVA. The EVA is prepared by copolymerization of vinyl acetate and ethylene monomers. A content of the vinyl acetate monomer for EVA will affect the properties of EVA. In general, the higher the content of the vinyl acetate monomer, the higher the resilience, flexibility, adhesion, transparency, solubility and impact resistance of said EVA. On the other aspect, the lower the content of the vinyl acetate monomer, the better rigidity and wear resistance of said EVA. Preferably, the content of the vinyl acetate monomer ranges from 8.0 wt % to 35 wt % based on a total weight of the vinyl acetate and ethylene monomers for EVA. In some cases, the EVA may be obtained from a recycled EVA material.

In some cases, the foam composition further comprises a thermoplastic polyolefin. Based on the total weight of the foam composition, the thermoplastic polyolefin may be in an amount from 5.0 wt % to 20 wt %. For example, the thermoplastic polyolefin may be selected from the group consisting of: an ethylene propylene copolymer, an ethylene propylene diene terpolymer, an ethylene octene copolymer, an ethylene butylene copolymer, and any combination thereof, but it is not limited thereto. Preferably, the thermoplastic polyolefin has a weight-average molecular weight (Mw) ranging from 78,000 to 140,000. Preferably, the thermoplastic polyolefin may be the ethylene octene copolymer. More preferably, in the ethylene octene copolymer produced from ethylene and octane monomers, a content of the octene ranges from 20 wt % to 50 wt % based on a total weight of the ethylene and octane monomers. The commercial product of the ethylene octene copolymer may be Solumer™ 891.

In accordance with the present invention, the foaming agent may be a thermally decomposable foaming agent. For example, a thermal decomposition temperature of the foaming agent ranges from 120° C. to 200° C. The foaming agent may be selected from the group consisting of: azodicarbonamide (AC), 4,4'-oxybis(benzenesulfonyl hydrazide) (OBSH), p-toluenesulfonyl hydrazide (TSH), sodium hydrogen carbonate, and any combination thereof, but it is not limited thereto.

In some cases, the foam composition further comprises a rubber. Based on the total weight of the foam composition, the rubber may be in an amount from 1.0 wt % to 20 wt %. Preferably, the rubber may have a Mooney viscosity (ML1+4 @ 120° C.) ranging from 20 to 50. For example, the rubber may be selected from the group consisting of: a natural rubber (NR), a styrene-butadiene rubber (SBR), a polybutadiene rubber (BR), an ethylene propylene rubber (EPR), a styrene-isoprene-styrene block copolymer, a halogenated isobutylene isoprene rubber, and any combination thereof, but it is not limited thereto. For example, the EPR comprises an ethylene propylene diene monomer rubber (EPDM). The SBR comprises a poly(styrene-butadiene-styrene) block copolymer. The halogenated isobutylene isoprene rubber comprises a chlorinated isobutylene isoprene rubber or a brominated isobutylene isoprene rubber. The BR can be classified by a content of cis-butadiene contained therein. A low-cis butadiene rubber has a cis-butadiene content of 35 mole % to 40 mole %; a high-cis butadiene rubber has a cis-butadiene content of 96 mole% to 98 mole %; and a super high-cis butadiene rubber has a cis-butadiene content of more than 98 mole %.

The foam composition may also be optionally added with an additive in an amount from 10 wt % to 29 wt % based on the total weight of the foam composition as needed on the premise of not affecting the above mentioned effect of the foam composition. For example, the additive may comprise a foaming promotor, a peroxide crosslinking aid, a tackifier, a plasticizer, a lubricant, a filler, and any combination thereof, but it is not limited thereto.

In accordance with the present invention, the foaming promotor can be used to lower the decomposition temperature of the foaming agent, to increase fluidity of the foam composition, to prevent corrosion of the mold, and to improve foam uniformity. For example, the foaming promotor may be selected from the group consisting of: zinc oxide, zinc octadecanoate, zinc phthalate, zinc carbonate, and any combination thereof, but it is not limited thereto. Preferably, the foaming promotor may be in an amount from 0.5 wt % to 1.5 wt % based on the total weight of the foam composition.

In order to increase the density of crosslinking of a foam, the foam composition may further comprise the peroxide crosslinking aid in an amount from 0.1 wt % to 1.0 wt % based on the total weight of the foam composition. In general, the peroxide crosslinking aid may be a reactive auxiliary agent with multifunctional groups which can react vigorously with free radicals, thereby producing more crosslinking and improving the crosslinking efficiency of the peroxide crosslinking aid. For example, the peroxide crosslinking aid may be selected from the group consisting of: trimethylolpropane triacrylate, 2,4,6-triallyloxy-1,3,5-triazine (TAC), triallyl isocyanurate (TAIL), N,N'-m-phenylene dimaleimide, and any combination thereof, but it is not limited thereto.

In accordance with the present invention, the foam composition may further comprise the tackifier in an amount from 5.0 wt % to 15 wt % based on the total weight of the foam composition. For example, the tackifier may be selected from the group consisting of: a terpene resin, a terpene phenolic resin, a polyterpene resin, a rosin resin, an aromatic hydrocarbon tackifier resin, a C5/C9 petroleum resin, and any combination thereof, but it is not limited thereto.

In accordance with the present invention, the foam composition may further comprise the plasticizer in an amount from 1.0 wt % to 3.0 wt % based on the total weight of the foam composition. For example, the plasticizer may be selected from the group consisting of: triethylene glycol bis(2-ethylhexanoate), tetraethylene glycol diheptylate, dibutyl sebacate, dihexyl adipate, dioctyl adipate (DOA), and any combination thereof, but it is not limited thereto.

In accordance with the present invention, the foam composition may further comprise the lubricant in an amount from 0.5 wt % to 1.5 wt % based on the total weight of the foam composition. For example, the lubricant may be selected from the group consisting of: stearic acid, zinc stearate, and a combination thereof, but it is not limited thereto.

In accordance with the present invention, the foam composition may further comprise the filler in an amount from 5.0 wt % to 17.0 wt % based on the total weight of the foam composition. For example, the filler may be selected from the group consisting of: talc, silica, magnesium carbonate, magnesium silicate, calcium carbonate, barium sulfate, clay, mica, magnesium hydroxide, aluminum hydroxide, and any combination thereof, but it is not limited thereto. Preferably, based on the total weight of the foam composition, the foam composition comprises the recycled polyvinyl butyral in an amount from 40 wt % to 60 wt %; the ethylene-ester copolymer in an amount from 10 wt % to 30 wt %; the foaming agent in an amount from 1.0 wt % to 2.0 wt %; the peroxide crosslinking agent in an amount from 0.5 wt % to 1.5 wt %; the hydrazide crosslinking agent in an amount from 0.5 wt % to 1.5 wt %; the thermoplastic polyolefin in an amount from 10 wt % to 15 wt %; the rubber in an amount from 5.0 wt % to 10 wt %; the foaming promotor in an amount from 0.5 wt % to 1.2 wt %; and the peroxide crosslinking aid in an amount from 0.3 wt % to 1.0 wt %.

The invention also provides a foam prepared from the above-mentioned foam composition. A method for foam molding may be thermal press foam molding, compression foam molding or injection foam molding, but it is not limited thereto.

The foam may be applied to a shock absorbing insole, a sports brace, a medical equipment pad, a yoga mat, an acoustic isolation material, or a low-resilience mat, but it is not limited thereto.

DETAILED DESCRIPTION OF THE PREFERRED EMBODIMENT

Hereinafter, one skilled in the arts can easily realize the advantages and effects of a foam composition and a foam thereof in accordance with the present invention from the following examples. It should be understood that the descriptions proposed herein are just preferable examples only for the purpose of illustrations, not intended to limit the scope of the invention. Various modifications and variations could be made in order to practice or apply the present invention without departing from the spirit and scope of the invention.

Raw Materials

1. Recycled PVB: purchased from Protrade Asia Limited;
2. EVA: wherein product model is UE629, manufactured by USI Corporation, containing 18 wt % of vinyl acetate units;
3. Recycled EVA: recovered from scrap materials of foaming EVA products;
4. Thermoplastic polyolefin: ethylene octene copolymer; wherein product model is Solumer 865, manufactured by SK Global Chemical Co., Ltd.;
5. Rubber: brominated isobutylene isoprene rubber; wherein product model is Bromobutyl 2211, manufactured by Exxon Mobil Corporation;
6. Tackifier: wherein product model is Foral 85, manufactured by Eastman Chemical Company;
7. Foaming agent: azodicarbonamide; wherein product model is Celogen754A, manufactured by Celchem LLC;
8. Dicumyl peroxide: wherein product model is Luperox DC40, manufactured by Arkema;
9. Succinic acid dihydrazide: wherein product model is SDH, manufactured by Oakwood Chemical;
10. Foaming promotor: zinc oxide; purchased from Zinc Corp of America;
11. Peroxide crosslinking aid: triallyl isocyanurate; wherein product model is TAIL, manufactured by Mitsubishi International Polymer Trade;
12. Lubricant: stearic acid; wherein product model is Stearic Acid manufactured, by Wei-Chuang Technical Materials;
13. Filler: calcium carbonate; wherein product model is Light Calcium Carbonate, manufactured by Etana Industrial Co., Ltd.; and
14. Filler: silica; wherein product model is Ultrasil VN3, manufactured by Evonik Industries.

Foam Composition

EXAMPLE 1 (E1)

First, the recycled PVB was placed in a kneader and kneaded for 10 minutes. Next, EVA, succinic acid dihydrazide, calcium carbonate, silica, zinc oxide, triallyl isocyanurate, and stearic acid were added to the kneader and stirred at a temperature of 120° C. for 12 minutes. At the last 2 minutes of the aforesaid mixing step, azodicarbonamide and dicumyl peroxide were added to the kneader and mixed for 2 minutes to obtain a mixture. Subsequently, the mixture was transferred to a double roller which raised the temperature, and then the mixture was transferred to a dispersing roller to obtain a uniform foam composition, called Foam Composition 1. The components of Foam Composition 1 were as follows: 54.6 wt % of recycled PVB, 23.4 wt % of EVA, 0.8 wt % of succinic acid dihydrazide, 13 wt % of calcium carbonate, 3.8 wt % of silica, 1.5 wt % of zinc oxide, 0.3 wt % of triallyl isocyanurate, 0.5 wt % of stearic acid, 1.4 wt % of azodicarbonamide, and 0.7 wt % of dicumyl peroxide.

Foam

Foam Composition 1 was placed in an open mixing mill and then processed with a sequential step of mixing, plastifying, and calendaring at 80° C. to obtain a sheet-like film in a thickness of 1 cm.

150 grams cut from said film was placed in a mold, and the mold was put into a flat-panel vulcanizer, and Foam Composition 1 underwent compression molding for 10 minutes to 15 minutes at 165° C. to 170° C. and under a compression pressure of 7 kg to 8 kg to obtain Foam 1.

EXAMPLES 2 to 4 (E2 to E4)

COMPARATIVE EXAMPLES 1 to 4 (C1 to C4

The foam compositions of Examples 2 to 4 were prepared according to the content ratios shown in Table 1, and then Foams 2 to 4 were prepared in the same procedure as in the preparation of Foam 1. The main difference between Foam Composition 1 of Example 1 and Foam Compositions 2 to 4 of Examples 2 to 4 was sources of EVA contained therein and weight ratios of recycled PVB and EVA.

The foam compositions of Comparative Examples 1 to 4 were prepared according to the content ratios shown in Table 2, and then Foams 7 to 10 were prepared in the same procedure as in the preparation of Foam 1. The main difference between Example 1 and Comparative Examples 1 to 4 was the components contained therein and their weight ratios.

EXAMPLE 5 (E5)

First, the recycled PVB was placed in a kneader and kneaded for 10 minutes. Next, EVA, the thermoplastic polyolefin, the rubber, the tackifier, succinic acid dihydrazide, calcium carbonate, silica, zinc oxide, triallyl isocyanurate, and stearic acid were added to the kneader and stirred at a temperature of 120° C. for 12 minutes. At the last 2 minutes of the aforesaid mixing step, azodicarbonamide and dicumyl peroxide were added to the kneader and mixed for 2 minutes to obtain a mixture. Subsequently, the mixture was transferred to a double roller which raised the temperature, and then the mixture was transferred to a dispersing roller to obtain a uniform foam composition, called Foam Composition 5. The components of Foam Composition 5 were as follows: 47 wt % of recycled PVB, 8.4 wt % of EVA, 15 wt % of the thermoplastic polyolefin, 6.7 wt % of the rubber, 6.7 wt % of the tackifier, 0.8 wt % of succinic acid dihydrazide, 8.5 wt % of calcium carbonate, 2.2 wt % of silica, 1.5 wt % of zinc oxide, 0.4 wt % of triallyl isocyanurate, 0.5 wt % of stearic acid, 1.6 wt % of azodicarbonamide, and 0.7 wt % of dicumyl peroxide.

Foam Composition 5 was placed in an open mixing mill and then processed with a sequential step of mixing, plastifying, and calendaring at 80° C. to obtain a sheet-like film with a thickness of 1 cm.

150 grams cut from said film was placed in a mold, the mold was put into a flat-panel vulcanizer, and Foam Composition 5 underwent compression molding for 10 minutes to 15 minutes at 165° C. to 170° C. and under a compression pressure of 7 kg to 8 kg to obtain Foam 5.

EXAMPLE 6 (E6)

COMPARATIVE EXAMPLES 5 and 6 (C5 and C6)

The foam composition of Example 6 was prepared according to the content ratios shown in Table 1, and then Foam 6 was prepared in the same procedure as in the preparation of Foam 5. The main difference between Foam Composition 5 of Example 5 and Foam Composition 6 of Example 6 was the components contained therein and their weight ratios.

The foam compositions of Comparative Examples 5 and 6 were prepared according to the content ratios shown in Table 2, and then Foams 11 and 12 were prepared in the same procedure as in the preparation of Foam 5. The main difference between Example 5 and Comparative Examples 5 and 6 was the components contained therein and their weight ratios.

TABLE 1 components of foam compositions of Examples 1 to 6

|  | E1 | E2 | E3 | E4 | E5 | E6 |
|---|---|---|---|---|---|---|
| Recycled PVB (wt %) | 54.6 | 39 | 23.4 | 54.6 | 47 | 20.2 |
| Recycled EVA (wt %) | 0 | 0 | 0 | 23.4 | 0 | 0 |
| EVA (wt %) | 23.4 | 39 | 54.6 | 0 | 8.4 | 28.8 |
| Thermoplastic polyolefin (wt %) | 0 | 0 | 0 | 0 | 15 | 6.7 |
| Rubber (wt %) | 0 | 0 | 0 | 0 | 6.7 | 13.5 |
| Tackifier (wt %) | 0 | 0 | 0 | 0 | 6.7 | 10.1 |
| Stearic acid (wt %) | 0.5 | 0.5 | 0.5 | 0.5 | 0.5 | 0.5 |
| Zinc oxide (wt %) | 1.5 | 1.5 | 1.5 | 1.5 | 1.5 | 1.5 |
| Calcium carbonate (wt %) | 13 | 13 | 13 | 13 | 8.5 | 11 |
| Silica (wt %) | 3.8 | 3.8 | 3.8 | 3.8 | 2.2 | 3.8 |
| Azodicarbonamide (wt %) | 1.4 | 1.4 | 1.4 | 1.4 | 1.6 | 1.9 |
| Dicumyl peroxide (wt %) | 0.7 | 0.7 | 0.7 | 0.7 | 0.7 | 0.7 |
| TAIC (wt %) | 0.3 | 0.3 | 0.3 | 0.3 | 0.4 | 0.5 |
| Succinic acid dihydrazide (wt %) | 0.8 | 0.8 | 0.8 | 0.8 | 0.8 | 0.8 |

TABLE 2 components of foam compositions of Comparative Examples 1 to 6

|  | C1 | C2 | C3 | C4 | C5 | C6 |
|---|---|---|---|---|---|---|
| Recycled PVB (wt %) | 54.6 | 39 | 23.4 | 54.6 | 47 | 20.2 |
| Recycled EVA (wt %) | 0 | 0 | 0 | 23.4 | 0 | 0 |
| EVA (wt %) | 23.4 | 39 | 54.6 | 0 | 8.4 | 28.8 |
| Thermoplastic polyolefin (wt %) | 0 | 0 | 0 | 0 | 15 | 6.7 |
| Rubber (wt %) | 0 | 0 | 0 | 0 | 6.7 | 13.5 |
| Tackifier (wt %) | 0 | 0 | 0 | 0 | 6.7 | 10.1 |
| Stearic acid (wt %) | 0.5 | 0.5 | 0.5 | 0.5 | 0.5 | 0.5 |
| Zinc oxide (wt %) | 1.5 | 1.5 | 1.5 | 1.5 | 1.5 | 1.5 |
| Calcium carbonate (wt %) | 13.8 | 13.8 | 13.8 | 13.8 | 8.5 | 11.8 |
| Silica (wt %) | 3.8 | 3.8 | 3.8 | 3.8 | 3 | 3.8 |
| Azodicarbonamide (wt %) | 1.4 | 1.4 | 1.4 | 1.4 | 1.6 | 1.9 |
| Dicumyl peroxide (wt %) | 0.7 | 0.7 | 0.7 | 0.7 | 0.7 | 0.7 |

TABLE 2-continued components of foam compositions of Comparative Examples 1 to 6

|  | C1 | C2 | C3 | C4 | C5 | C6 |
|---|---|---|---|---|---|---|
| TAIC (wt %) | 0.3 | 0.3 | 0.3 | 0.3 | 0.4 | 0.5 |
| Succinic acid dihydrazide (wt %) | 0 | 0 | 0 | 0 | 0 | 0 |

Analysis:

Foams 1 to 12 prepared from the foam composition of Examples 1 to 6 and Comparative Examples 1 to 12 were analyzed on the mechanical properties, volumetric expansion factor, hardness, specific gravity, and odor, and the results were listed in Tables 3 and 4. In order to ensure the experimental significance of the characteristic analysis, Foams 1 to 12 were each respectively formed in the same manner from the corresponding foam compositions, and Foams 1 to 12 were each analyzed by the same test method. Therefore, it can be understood that the difference in characteristics of each of Foams 1 to 12 was mainly caused by the difference in composition of each of the foam compositions.

1. Rheological properties (TS2): measured in accordance with the standard D5289 established by American Society for Testing and Materials (ASTM);
2. Rheological properties (TC90): measured in accordance with the standard ASTM D5289;
3. Maximum torque ($M_h$): measured in accordance with the standard ASTM D5289;
4. Minimum torque ($M_l$): measured in accordance with the standard ASTM D5289;
5. Volumetric expansion factor: every foam composition was put into a mold of a fixed size (length×width×height=140 cm×100 cm×15 cm), wherein there was a 100 cm groove in the bottom of the mold; when the foam thereof was formed, a new length of the groove was measured by a ruler (unit: centimeter), and the volumetric expansion factor was defined as the new length divided by 100;
6. Hardness (type C): measured in accordance with the standard ASTM D792-13;
7. Specific gravity: measured in accordance with the standard ASTM D792-13;
8. Rebound resilience: measured in accordance with the standard ASTM D2632-92; and
9. Odor test: evaluated by an olfactory test in which a same tester assessed the odors of Foams 1 to 12, respectively.

TABLE 3 characteristics of Examples 1 to 6 and obtained Foams 1 to 6

|  | Foam 1 | Foam 2 | Foam 3 | Foam 4 | Foam 5 | Foam 6 |
|---|---|---|---|---|---|---|
|  | \multicolumn{6}{c}{Example No.} | | | | | |
|  | E1 | E2 | E3 | E4 | E5 | E6 |
| Rheological properties (TS2) (min(') sec(")) | 4'16" | 4'26" | 3'01" | 6'28" | 0'00" | 0'00" |
| Rheological properties (TC90) (min(') sec(")) | 7'15" | 7'14" | 6'48" | 7'33" | 8'09" | 8'10" |
| Maximum torque | 3.21 | 3.15 | 3.72 | 2.68 | 1.19 | 1.2 |
| Minimum torque | 0.19 | 0.26 | 0.3 | 0.71 | 0.21 | 0.27 |
| Volumetric expansion factor (%) | 175 | 175 | 175 | 155 | 175 | 175 |
| Hardness (type C) | 23 | 26 | 45-55 | 30 | 22 | 45 |
| Specific gravity (g/cm³) | 0.13 | 0.125 | 0.12 | 0.14 | 0.135 | 0.125 |
| Rebound resilience (%) | 15% | 21% | 26% | 10-11% | 17% | 24% |
| Odor test | \multicolumn{6}{c}{No odor} | | | | | |

TABLE 4 characteristics of Comparative Examples 1 to 6 and obtained Foams 7 to 12

|  | Foam 7 | Foam 8 | Foam 9 | Foam 10 | Foam 11 | Foam 12 |
|---|---|---|---|---|---|---|
|  | \multicolumn{6}{c}{Example No.} | | | | | |
|  | C1 | C2 | C3 | C4 | C5 | C6 |
| Rheological properties (TS2) (min(') sec(")) | 7'31" | 6'20" | 6'58" | 7'10" | 0'00" | 0'00" |
| Rheological properties (TC90) (min(') sec(")) | 8'37" | 8'09" | 8'38" | 8'20" | 8'28" | 8'36" |
| Maximum torque | 2.67 | 2.88 | 2.99 | 2.34 | 1.02 | 1.07 |
| Minimum torque | 0.19 | 0.27 | 0.33 | 0.71 | 0.22 | 0.26 |
| Volumetric expansion factor (%) | 175 | 175 | 175 | 155 | 175 | 175 |
| Hardness (type C) | 21 | 23 | 40 | 27 | 20 | 39 |
| Specific gravity (g/cm³) | 0.13 | 0.125 | 0.12 | 0.14 | 0.135 | 0.125 |
| Rebound resilience (%) | 19% | 25% | 30% | 15% | 21% | 29% |
| Odor test | \multicolumn{6}{c}{Unpleasant odor} | | | | | |

As shown in Table 3, Foams 1 to 6 prepared from the foam composition including the hydrazide crosslinking agent (i.e., Examples 1 to 6) did not emit the unpleasant odor of the aldehydes. In contrast, as shown in Table 4, Foams 7 to 12 prepared from the foam composition without the hydrazide crosslinking agent (i.e., Comparative Examples 1 to 6) emitted unpleasant odor.

In addition, in order to further compare the difference in characteristics of the foam compositions having similar compositions of the respective groups, the analytical results of Foam 1 obtained by the foam composition of Example 1 were compared with those of Foam 7 obtained by the foam composition of Comparative Example 1. Similarly, the analytical results of Foam 2 obtained by the foam composition of Example 2 were compared with those of Foam 8 obtained by the foam composition of Comparative Example 2. The comparisons can demonstrate the effect of adding the hydrazide crosslinking agent into the foam composition.

From the comparisons of the rheological properties (TS2) in Tables 3 and 4, compared to the foam composition free of hydrazide crosslinking agent, the foam prepared from the foam composition including the hydrazide crosslinking agent would have a lower TS2 value. For example, the TS2 value of Foam 1 was reduced by about 43% compared to the TS2 value of Foam 7; the TS2 value of Foam 2 was reduced by about 30% compared to the TS2 value of Foam 8; the TS2 value of Foam 3 was reduced by about 57% compared to the TS2 value of Foam 9; and the TS2 value of Foam 4 was reduced by about 10% compared to the TS2 value of Foam 10. It illustrated that each of the foam compositions of Examples 1 to 4 had good fluidity at the initial reaction period, and thus all the components in the foam composition could be uniformly dispersed. Besides, since the foam compositions of Examples 5 and 6 contained the tackifier and the thermoplastic polyolefin and the tackifier was in a form of liquid at 170° C. while processing the compression foam molding, the reaction initiated from the peroxide crosslinking agent would be delayed. Therefore, said foam composition had a better fluidity at the initial reaction period.

Moreover, from the comparisons of the rheological properties (TC90) in Tables 3 and 4, compared to the foam composition free of the hydrazide crosslinking agent, the foam prepared from the foam composition including the hydrazide crosslinking agent would have a lower TC90 value. For example, the TC90 value of Foam 1 was reduced by about 16% compared to the TC90 value of Foam 7; the TC90 value of Foam 2 was reduced by about 11% compared to the TC90 value of Foam 8; the TC90 value of Foam 3 was reduced by about 21% compared to the TC90 value of Foam 9; the TC90 value of Foam 4 was reduced by about 9% compared to the TC90 value of Foam 10; the TC90 value of Foam 5 was reduced by about 4% compared to the TC90 value of Foam 11; and the TC90 value of Foam 6 was reduced by about 5% compared to the TC90 value of Foam 12. It illustrated that time needed for 90% completion of Foams 1 to 6 was reduced. That is, the reaction rate of the foam composition was increased.

From the comparisons of the maximum torque in Tables 3 and 4, compared to the foam composition free of hydrazide crosslinking agent, the foam prepared from the foam composition including the hydrazide crosslinking agent would have a higher $M_h$ value. Specifically, the $M_h$ value of Foam 1 was higher than the $M_h$ value of Foam 7; the $M_h$ value of Foam 2 was higher than the $M_h$ value of Foam 8; the $M_h$ value of Foam 3 was higher than the $M_h$ value of Foam 9; the $M_h$ value of Foam 4 was higher than the $M_h$ value of Foam 10; the $M_h$ value of Foam 5 was higher than the $M_h$ value of Foam 11; and the $M_h$ value of Foam 6 was higher than the $M_h$ value of Foam 12. It illustrated that each of Foams 1 to 6 had a better shear modulus, better elongation, and higher crosslinking density.

In addition, from the comparisons of the hardness in Tables 3 and 4, compared to the foam composition free of hydrazide crosslinking agent, the foam prepared from the foam composition including the hydrazide crosslinking agent would have a higher hardness. Specifically, the hardness of Foam 1 was higher than the hardness of Foam 7; the hardness of Foam 2 was higher than the hardness of Foam 8; the hardness of Foam 3 was higher than the hardness of Foam 9; the hardness of Foam 4 was higher than the hardness of Foam 10; the hardness of Foam 5 was higher than the hardness of Foam 11; and the hardness of Foam 6 was higher than the hardness of Foam 12. It illustrated that each of Foams 1 to 6 had a higher hardness; that is, each of Foams 1 to 6 had an improved mechanical property.

From the comparisons of the rebound resilience in Tables 3 and 4, the foam prepared from the foam composition including the hydrazide crosslinking agent would have a higher rebound resilience compared to the foam prepared from the foam composition free of hydrazide crosslinking agent. Specifically, the rebound resilience of Foam 1 was higher than the rebound resilience of Foam 7; the rebound resilience of Foam 2 was higher than the rebound resilience of Foam 8; the rebound resilience of Foam 3 was higher than the rebound resilience of Foam 9; the rebound resilience of Foam 4 was higher than the rebound resilience of Foam 10; the rebound resilience of Foam 5 was higher than the rebound resilience of Foam 11; and the rebound resilience of Foam 6 was higher than the rebound resilience of Foam 12. It illustrated that each of Foams 1 to 6 had a better deformation recovery ability.

Based on the results in Tables 3 and 4, the use of the foam composition not only eliminates the unpleasant odor of aldehydes emitted from the prepared foam but also improves the mechanical properties of the foam, thus enhancing the application value of the foam composition and the foam thereof of the present invention.

What is claimed is:

1. A foam composition comprising:
    a recycled polyvinyl butyral in an amount from 5 wt % to 70 wt % based on a total weight of the foam composition;
    an ethylene-ester copolymer in an amount from 10 wt % to 70 wt % based on the total weight of the foam composition;
    a foaming agent in an amount from 0.5 wt % to 3.5 wt % based on the total weight of the foam composition;
    a peroxide crosslinking agent in an amount from 0.5 wt % to 3.0 wt % based on the total weight of the foam composition; and
    a hydrazide crosslinking agent in an amount from 0.1 wt % to 2.5 wt % based on the total weight of the foam composition.

2. The foam composition as claimed in claim 1, wherein the hydrazide crosslinking agent is selected from the group consisting of: a monohydrazide compound, a dihydrazide compound, a polyhydrazide compound, and any combination thereof.

3. The foam composition as claimed in claim 2, wherein the hydrazide crosslinking agent is the dihydrazide compound, and the dihydrazide compound is selected from the group consisting of: succinic dihydrazide, adipic acid dihydrazide, azelaic acid dihydrazide, sebacic acid dihydrazide, and any combination thereof.

4. The foam composition as claimed in claim 1, wherein the peroxide crosslinking agent is selected from the group consisting of: dicumyl peroxide, 2,5-dimethyl-2,5-di(tert-buytlperoxy)-3-hexyne, 2,5-dimethyl-2,5-di(tert-butylperoxy)hexane, 1,1-di(tert-butylperoxy)-3,3,5-trimethylcyclohexane, tert-butyl cumyl peroxide, and any combination thereof.

5. The foam composition as claimed in claim 3, wherein the peroxide crosslinking agent is selected from the group consisting of: dicumyl peroxide, 2,5-dimethyl-2,5-di(tert-buytlperoxy)-3-hexyne, 2,5-dimethyl-2,5-di(tert-butylperoxy)hexane, 1,1-di(tert-butylperoxy)-3,3,5-trimethylcyclohexane, tert-butyl cumyl peroxide, and any combination thereof.

6. The foam composition as claimed in claim 1, wherein the ethylene-ester copolymer is selected from the group consisting of: an ethylene-vinyl acetate copolymer, an ethylene-methyl acrylate copolymer, an ethylene-ethyl acrylate copolymer, an ethylene-butyl acrylate copolymer, and any combination thereof.

7. The foam composition as claimed in claim 6, wherein the ethylene-ester copolymer is the ethylene-vinyl acetate copolymer; the ethylene-vinyl acetate copolymer is prepared by a copolymerization of vinyl acetate and ethylene monomers, wherein a content of the vinyl acetate monomer ranges from 8.0 wt % to 35 wt % based on a total weight of the vinyl acetate and ethylene monomers.

8. The foam composition as claimed in claim 1, wherein the foaming agent is selected from the group consisting of: azodicarbonamide, 4,4'-oxybis(benzenesulfonyl hydrazide), p-toluenesulfonyl hydrazide, sodium hydrogen carbonate, and any combination thereof.

9. The foam composition as claimed in claim 1, wherein the foam composition further comprises a thermoplastic polyolefin in an amount from 5.0 wt % to 20 wt % based on the total weight of the foam composition.

10. The foam composition as claimed in claim 9, wherein the thermoplastic polyolefin is selected from the group consisting of: an ethylene propylene copolymer, an ethylene propylene diene terpolymer, an ethylene octene copolymer, an ethylene butylene copolymer, and any combination thereof.

11. The foam composition as claimed in claim 1, wherein the foam composition further comprises a rubber in an amount from 1.0 wt % to 20 wt % based on the total weight of the foam composition.

12. The foam composition as claimed in claim 1, wherein the foam composition further comprises an additive in an amount from 10 wt % to 29 wt % based on the total weight of the foam composition; wherein the additive is selected from the group consisting of: a foaming promotor, a peroxide crosslinking aid, a tackifier, a plasticizer, a lubricant, a filler, and any combination thereof.

13. The foam composition as claimed in claim 12, wherein the foaming promotor is selected from the group consisting of: zinc oxide, zinc octadecanoate, and a combination thereof; and
the peroxide crosslinking aid is selected from the group consisting of:
trimethylolpropane triacrylate, 2,4,6-triallyloxy-1,3,5-triazine, triallyl isocyanurate, N,N'-m-phenylene dimaleimide, and any combination thereof.

14. The foam composition as claimed in claim 9, wherein the foam composition further comprises a rubber, a foaming promotor, and a peroxide crosslinking aid; and
wherein based on the total weight of the foam composition, the recycled polyvinyl butyral is in an amount from 40 wt % to 60 wt %;
the ethylene-ester copolymer is in an amount from 10 wt % to 30 wt %;
the foaming agent is in an amount from 1.0 wt % to 2.0 wt %;
the peroxide crosslinking agent is in an amount from 0.5 wt % to 1.5 wt %;
the hydrazide crosslinking agent is in an amount from 0.5 wt % to 1.5 wt %;
the thermoplastic polyolefin is in an amount from 10 wt % to 15 wt %;
the rubber is in an amount from 5.0 wt % to 10 wt %;
the foaming promotor is in an amount from 0.5 wt % to 1.2 wt %; and
the peroxide crosslinking aid is in an amount from 0.3 wt % to 1.0 wt %.

15. A foam produced from the foam composition as claimed in claim 1.

* * * * *